United States Patent [19]

Behle

[11] 4,161,958

[45] Jul. 24, 1979

[54] FIXTURE ASSEMBLY FOR REMOVING OPERATING ASSEMBLY FROM BOTTOM OPERABLE TANK CAR VALVE WHILE CLOSURE PORTION REMAINS IN CLOSED POSITION IN THE TANK

[75] Inventor: Gunter R. Behle, St. Charles, Mo.

[73] Assignee: ACF Industries, Incorporated, New York, N.Y.

[21] Appl. No.: 820,552

[22] Filed: Aug. 1, 1977

[51] Int. Cl.[2] .................... F16K 43/00; F16K 51/00
[52] U.S. Cl. ............................... 137/316; 137/315; 29/157.1 R; 29/401 F; 251/128
[58] Field of Search ............... 251/144, 291; 137/315, 137/316, 329, 128, 269; 29/401, 157.1 R, 156.7 R, 401 D, 401 E, 401 F

[56] References Cited

U.S. PATENT DOCUMENTS

| Re. 27,895 | 1/1974 | Ray | 29/401 |
|---|---|---|---|
| 1,950,307 | 3/1934 | Ivins | 29/157.1 R |
| 3,626,576 | 12/1971 | Ray | 29/401 |
| 3,763,880 | 10/1973 | Leopold, Jr. et al. | 137/316 |
| 3,981,481 | 9/1976 | Reedy et al. | 251/144 |
| 4,022,583 | 5/1977 | Kammeraad | 29/156.7 R |

Primary Examiner—William R. Cline
Assistant Examiner—A. Michael Chambers
Attorney, Agent, or Firm—Henry W. Cummings

[57] ABSTRACT

The present invention is directed to a fixture assembly for removing for repair and/or replacement some or all of the operating assembly of a bottom operable tank car valve while the closure portion of the valve, which closes the opening in the tank bottom, remains in closed position. The closure portion prevents lading from escaping from the tank while the damaged portion of the valve operating assembly is repaired and/or replaced, and the operating assembly is reassembled with a properly functioning valve operating assembly.

13 Claims, 10 Drawing Figures

FIXTURE ASSEMBLY FOR REMOVING OPERATING ASSEMBLY FROM BOTTOM OPERABLE TANK CAR VALVE WHILE CLOSURE PORTION REMAINS IN CLOSED POSITION IN THE TANK

BACKGROUND OF THE INVENTION

This invention relates to bottom operable railway tank car valves, and to the removal of damaged portions of the bottom operable valve while the closure portion of the valve remains closed and lading is retained in the tank.

The bottom operable tank car valve in U.S. Pat. No. 3,981,481 includes a valve closure portion which in closed position closes the opening in the bottom of the tank, preventing lading discharge; and an operating assembly for moving the closure portion relative to the tank bottom opening for loading and/or unloading lading. The operating assembly includes a first threaded operator which is attached to the closure portion with removable fasteners. The first operator depends from the valve closure portion and engages a second, rotatable threaded operator. The second threaded operator remains vertically fixed by a retainer as it is rotated and engages the first threaded operator and moves it and the closure portion vertically between opened and closed position. The retainer has spaced ribs extending radially between a tank bottom flange portion and the second operator to maintain the valve closure seated when the valve closure is in closed position.

Railway tank cars occasionally derail and in some instances the tank becomes dislodged from the car truck. If the tank has a bottom operable lading loading and/or unloading valve, such as the one disclosed in said U.S. Pat. No. 3,981,481, severe impacts to the valve assembly may occur during and/or after such derailment. Such impacts may damage or render inoperative some or all of the operating mechanism used to unload the lading from the tank.

SUMMARY OF THE INVENTION

The object of the present invention is to provide a fixture assembly for removing for repair and/or replacement some or all of the operating assembly of a bottom operable tank car valve while the valve closure portion of the valve remains in closed position, preventing lading from escaping from the tank while the damaged portion of the valve operating assembly is repaired and/or replaced, and the operating assembly is reassembled with a properly functioning valve operating assembly.

The fixture assembly includes a first fixture having a first fixture plate and at least a pair of first fixture spacers which maintain the first fixture plate spaced from the tank bottom flange. The first fixture plate includes first fixture openings which align with openings in the valve closure which attach the first operator to the valve closure. Some, but not all, of the fasteners holding the first operator in place are removed and are replaced with long studs extending through the first fixture openings into the valve closure fastener openings. Nuts are attached which are tightened down against the lower surface of the first fixture plate to positively urge the valve closure into the closed position. The remaining fasteners are removed from the valve closure which allows the first and second operator and the retainer portion to descend to the upper surface of the first fixture plate. With the long studs still in place, a second fixture including a second fixture plate is inserted between the first operator and the tank bottom flange, between the first fixture spacers. The second plate is V shaped, with second plate spacers on each arm engaging the tank bottom flange. A third plate is inserted into an opening provided at the junction of the V arms in the second plate, and a fastener is inserted between the second and third plates to maintain them assembled. The upper surface of the third plate also engages the bottom surface of the tank bottom flange. The second fixture arms may be conveniently spaced at approximately 120° between each arm, although this is not critical. Second fixture short studs are inserted through second fixture openings provided in the second fixture arms and are threaded into the remaining openings in the valve closure. Nuts are tightened down on the lower ends of the second fixture studs to urge the valve closure into closed position, and the second fixture into firm engagement with the tank bottom flange. The first fixture nuts may then be disconnected and the first fixture studs removed from the openings in the valve closure. This enables the first fixture; the first and second operator, and the retainer to be removed from the tank bottom for repair or replacement of damaged valve operator parts. The second fixture studs maintain the valve closure in closed position retaining the lading in tank during repair or replacement of the valve operator ports which have been removed.

To reassemble the valve with repaired and/or replaced parts, the repaired and/or replaced parts including the retainer, the first and second valve operator portions and the retainer portion are first placed on the first fixture plate with the retainer ribs spaced apart and extending radially on the first fixture plate. First fixture studs are extended through the first fixture openings and through openings in the first operator and the space between the retainer ribs. The first fixture studs are threaded into the remaining fastener openings in the valve closure and first fixture nuts attached to urge the closure portion into closed position and the first fixture spacers into firm engagement with the tank bottom flange. Then the second fixture studs are removed from the openings in the valve closure, and the second fixture is disassembled and removed. The first and second operator and retainer portions are then raised with the first operator passing along the first fixture studs, and fasteners are attached through the remaining openings in the first operator to hold the first operator in place depending from the valve closure. In the assembled position the retainer ribs engage the tank bottom flange and urge the valve closure into the closed seated position. The first fixture studs are then removed from the openings in the valve closure and the first fixture removed. The remaining fasteners are inserted to maintain the first and second operators and retainer in operative position. A protective housing may then be attached with fasteners extending into the tank bottom flange, and the bottom operable tank car valve assembly is complete, allowing the tank to be unloaded or moved to a different location for unloading.

DESCRIPTION OF PREFERRED EMBODIMENT

Figure 1:
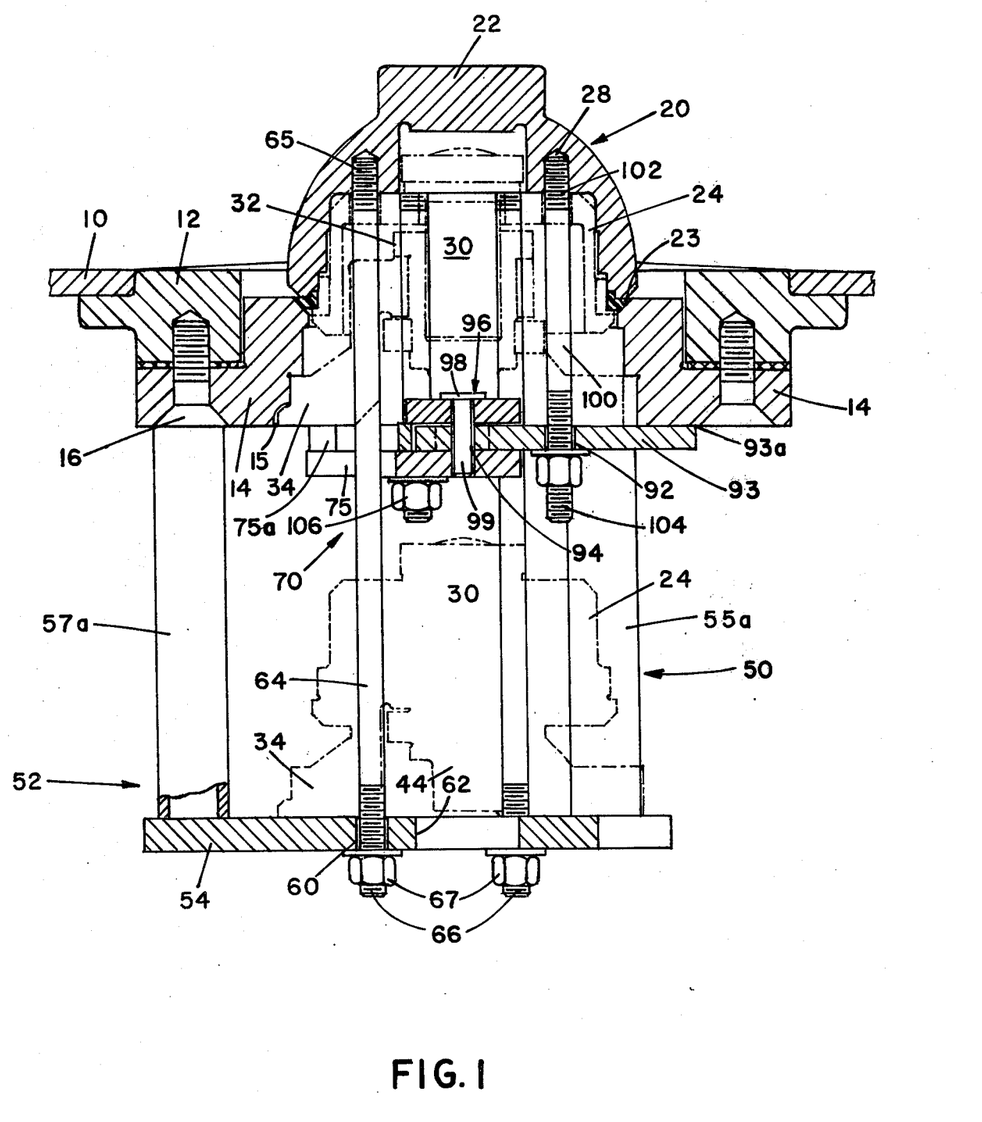
FIG. 1 is sectional view illustrating the first and second fixtures in place.
Figure 1A:
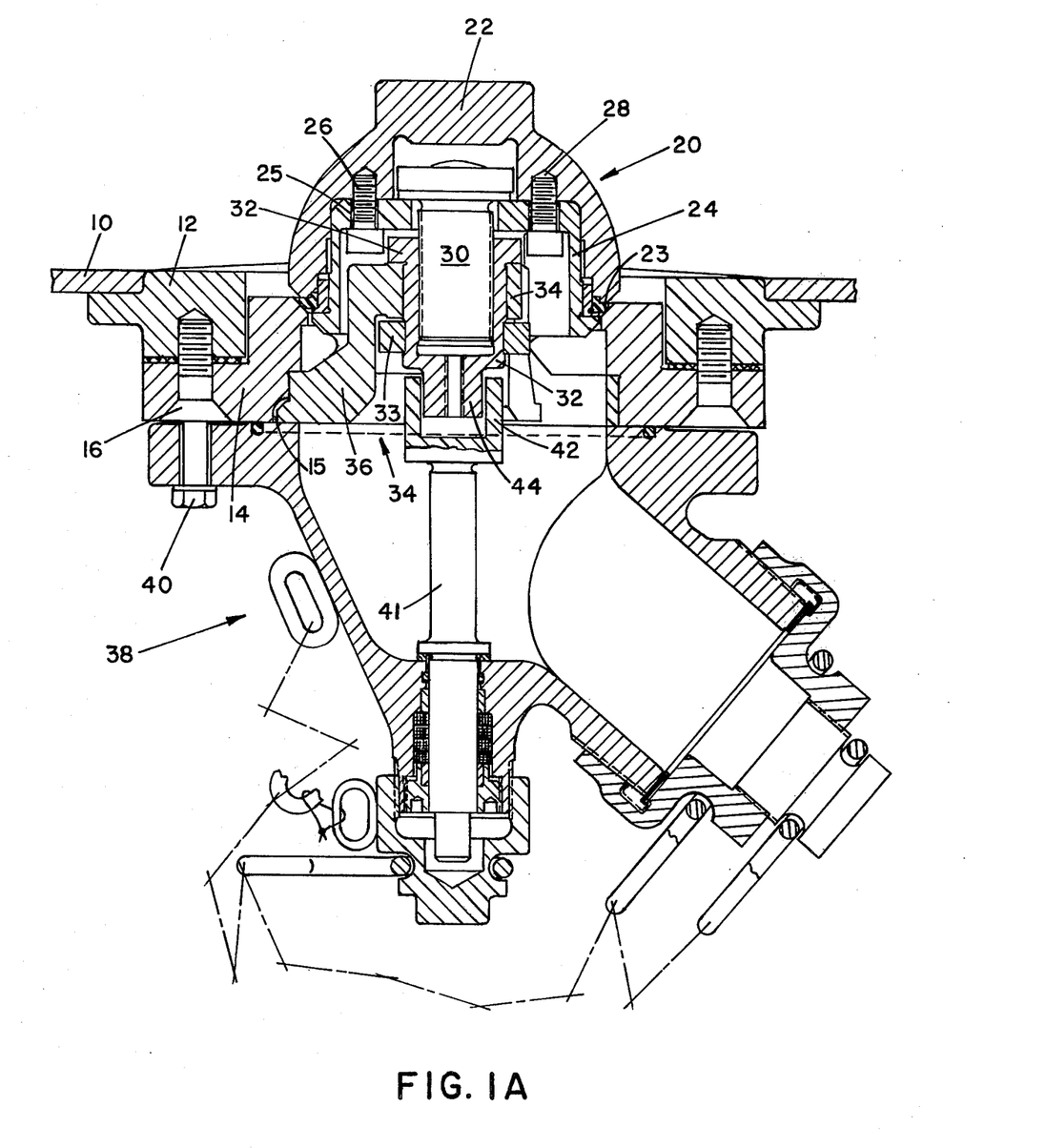
FIG. 1A is a sectional view of the bottom operable valve assembly to which the fixture assembly of the present invention is adapted to be utilized.

In the drawings a railway tank car is indicated generally at 10. The tank includes a bottom flange 12 rigidly attached thereto. A valve flange 14 is attached to tank flange 12 by means of fasteners 16. A bottom operable valve assembly indicated generally at 20 includes a valve closure member 22 movable vertically between open and closed position engaging valve seat 23, for loading and/or unloading the lading from the tank. A first depending operator 24 having openings 25 is attached to valve closure 22 with fasteners 26 extending into threaded fastener openings 28 in the valve closure. A plurality of threaded fastener openings 28 are provided, six fastener openings being illustrated in the drawings. First operator 24 includes a depending threaded portion 30 which is engaged by a second operator 32 which is internally threaded and is affixed against vertical movement by means of collar 33, retainer 34 and flange 32a. Retainer 34 includes a plurality of radially extending ribs 36 which are radially spaced apart which engage valve flange 14 in slots 15. A depending housing 38 is provided which is removably attached to valve flange 14 with fasteners 40. Housing 38 includes an operator 41 having a connection portion 42 which engages a depending operating nut 44 on second operator 32. For a more detailed description of the operation of the bottom operable valve assembly reference may be made to U.S. Pat. No. 3,981,481 granted Sept. 12, 1976 and application Ser. Nos. 804,644 and 804,663 both filed June 8, 1977, hereby incorporated into the present application by this reference.

In the event of impact to the valve housing which renders the valve operating assembly inoperative, which may occur for example upon derailment of the car and possible separation of the tank from the trucks supporting the tank, it is desirable to remove the damaged portion of the operating assembly for repair and/or replacement, while maintaining the valve closure in the closed position, maintaining the lading in the tank.

Housing 38 is first removed by removing fasteners 40, allowing operator 41 to descend from nut 44, leaving in place operators 32 and 24.

Figure 2:
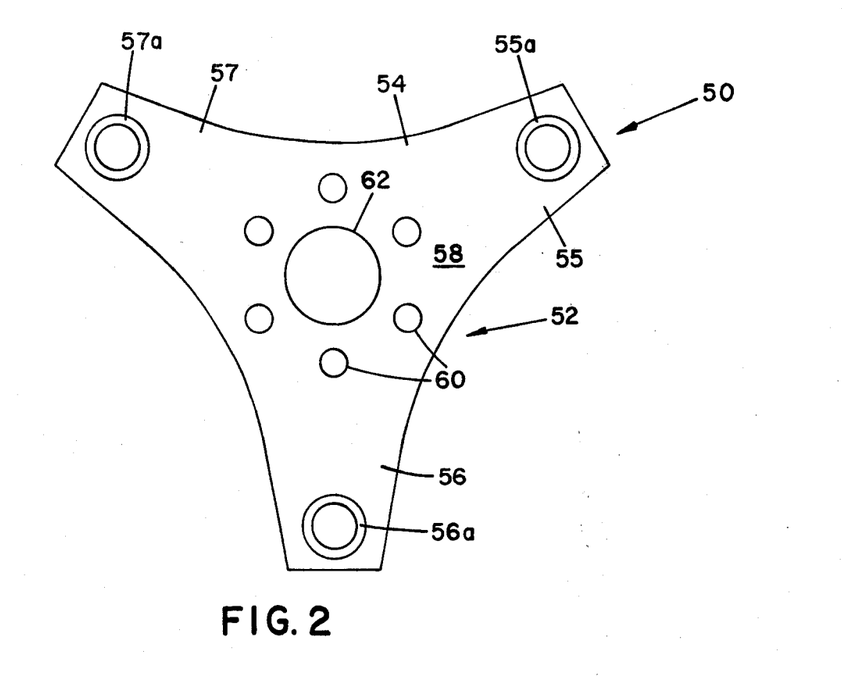
FIG. 2 is a plan view of the first fixture plate and first fixture spacers.

In accordance with the present invention a fixture assembly is provided to remove damaged portions of the operating assembly from the valve closure 22 while the valve closure remains in closed, seated position preventing leakage of lading from the tank while the damaged parts are being repaired or replaced. The fixture assembly is indicated in the drawings generally at 50 and includes a first fixture indicated at 52 which includes a first fixture plate 54 having arm portions 55, 56, and 57 spaced apart from a body portion 58, approximately 120° apart (FIG. 2). Spacers 55a, 56a, and 57a are rigidly attached to each arm, for example by welding. Spacers 55a, 56a and 57a are illustrated as pipe sections but may be made of solid members if desired. If desired spacers 55a, 56a and 57a may be hinged at 55b, 56b and 57b to be foldable (FIGS. 8 and 8a) into closed position for transport. A plurality of openings 60 (FIG. 2) are provided in the body portion of the plate, the number of openings corresponding to the number of openings 25 and 28 in first operator 24 and in closure member 22 which holds depending first operator 24 in place. However, the diameter of the openings 60 is larger than the diameter of the openings 25 and fasteners 26. An opening 62 is provided in the body portion 58 to enable a pullrod to be inserted onto the operating nut 44 in order to aid elements 24, 32, and 34 in their downward movement in the event of lading residue encumbrances.

The first fixture further includes long studs 64. The number of studs is approximately the half number of the openings 25 or 28. Studs 64 are threaded at each of their ends at 65 and 66. The diameter of threads 65 is such as could be received within the threaded openings 28 in the valve closure. Nuts 67 are applied to the lower end 66 to maintain studs 64 in place as illustrated in FIG. 1 with spacers 55a, 56a, and 57a in engagement with tank bottom flange 14.

Figure 3:
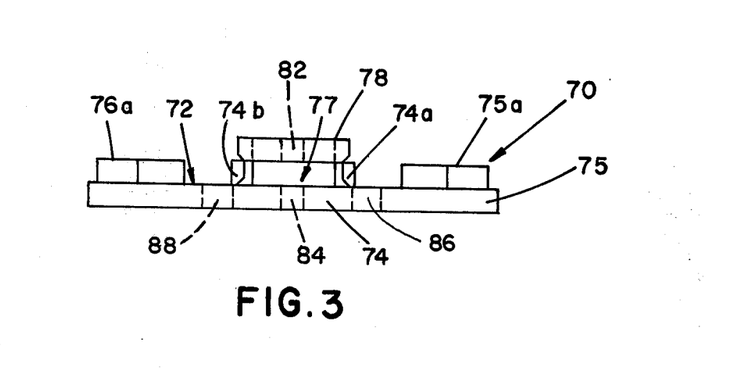
FIG. 3 is a front elevation view of a part of the second fixture.
Figure 4:
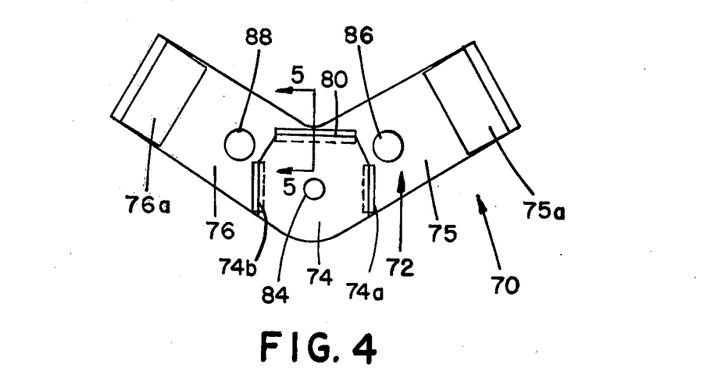
FIG. 4 is a plan view of the second fixture shown in FIG. 3, with the top plate removed for clarity.
Figure 5:
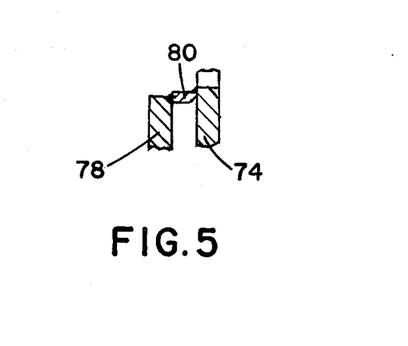
FIG. 5 is a sectional view looking in the direction of the arrows along the line 5—5 in FIG. 4.

A second fixture 70 is provided including a second fixture plate 72 (FIGS. 3 and 4) which is generally V shaped including a body portion 74 and a pair of arms 75 and 76. Each of the arms 75 and 76 have spacers 75a and 76a formed thereon or attached thereto. Body portion 74 includes a pocket 77 defined by spacers 74a and 74b, a plate 78 attached to the top of the spacers, and a rear plate 80 attached to top plate 78 and body portion 74 by welding as shown in FIG. 5. Upper and lower aligned openings 82 and 84 are formed in plates 78 and 74. In addition openings 86 and 88 are provided in respective arms 75 and 76 of larger diameter than the openings in closure member 22.

Figure 6:
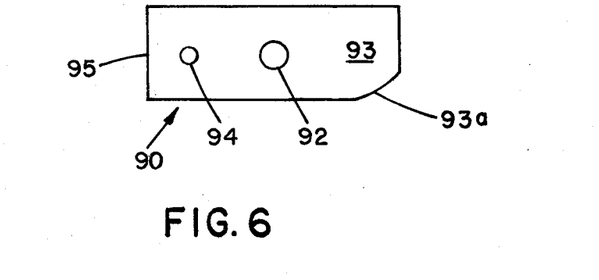
FIG. 6 is a plan view of the third fixture plate.
Figure 7:
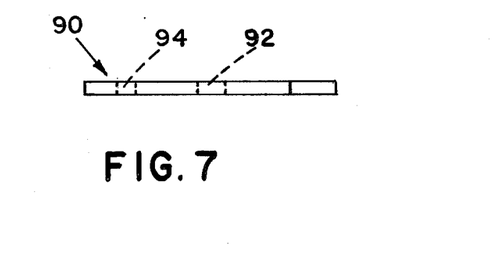
FIG. 7 is a side elevation view of the third fixture plate.

A third plate 90 shown in FIGS. 6 and 7 is generally rectangular shaped and includes an opening in the midportion thereof 92, and an opening at one end 94. Plate 90 is inserted into the pocket 77 with the end 95 of plate 90 abutting plate 80. Opening 94 aligns with openings 82 and 84 and a pin 96 (FIG. 1) is inserted having a head portion 98 resting on plate 78 and a shank portion 99 extending downwardly through openings 94, 84, and 82.

Thus in the assembled condition the fixture 70 includes three arms 75, 76 and the distal end portion 93 of plate 90. Each arm includes a respective opening 86, 88 and 92 having a diameter greater than the openings 28 in closure member 22. Second fixture 70 is formed in two parts to facilitate placement of the second fixture above the first fixture without interference with studs 64 and/or spacers 55a, 56a, and 57a. Note cut out portion 93a, on plate 90 for this purpose.

Second fixture 70 also includes second fixture studs 100, (FIG. 1) threaded at either end as indicated at 102 and 104 adapted to pass through second fixture openings 86, 88 and 92.

To remove, to replace or repair the operating assembly for valve closure 20 with lading in the tank, fasteners 40 are first removed which allows removal of housing 38 and exposing connection portion 44, unless housing 44 has already dropped off due to shearing of fasteners 40 due to impact to the housing, for example, in a derailment.

The first fixture is applied to the tank bottom, the first fixture spacers engaging the tank bottom flange 14 to maintain the first fixture plate spaced from the tank bottom flange. The first fixture openings 60 align with openings 25 in depending operator 24, and openings 28 in the valve closure, which attach the first operator to the valve closure. Some but not all of the fasteners 26 holding the first operator in place are removed and are replaced with first fixture studs 64 extending through the first fixture openings 60 into the valve closure fasteners openings 28. Nuts 67 are attached which are tightened down against the lower surface of the first fixture plate 54 to positively urge the valve closure 22 into the closed position engaging valve seat 23. The remaining fasteners 26 are removed from the valve closure which allows the first operator 24 and second operator 32 and the retainer 34 to descend to the upper surface of the first fixture plate 54, as shown in phantom in FIG. 1.

With the first fixture studs 64 still in place, the second fixture 70 including a second fixture plate 72 is inserted below the second operator 32 and the valve flange 14 between the first fixture spacers 55a, 56a and 57a. The second fixture plate 72 is V shaped, with second fixture spacers 75a and 76a engaging the tank valve flange 14. The third plate 90 is inserted into the pocket 77 provided at the juncture of the V arms in the second plate. A fastener 96 is inserted between the second and third plate to maintain them assembled. The upper surface 93a of the end 93 of the third plate 90 also engages the bottom surface of the tank valve flange 14. The second fixture arms are thus spaced at approximately 120° between each arm. Second fixture studs 100 are inserted through second fixture openings 86, 88 and 92 and are threaded into the remaining openings 28 in the valve closure. Nuts 106 are tightened down on the lower ends of the second fixture studs to urge the valve closure into closed, seated position, and the second fixture into firm engagement with the tank valve flange 14.

The first fixture nuts 67 may then be disconnected and the first fixture studs 64 removed from the openings in the valve closure. This enables the first fixture 52, the first operator 24, second operator 32, and retainer 34 to be removed from the tank bottom for repair or replacement of damaged valve operator parts. The second fixture studs 100 maintain the valve closure in closed and seated position retaining the lading in the tank during repair or replacement of the valve operator parts which have been removed.

To reassemble the valve with repaired and/or replaced parts, the repaired and/or replaced parts including the retainer 34, the first operator 24 and second operator 32 are first placed on the first fixture plate 54 with the retainer ribs 36 spaced apart and extending radially on the first fixture plate 54. First fixture studs 64 are extended through the first fixture openings 60 and through openings 25 in the first operator and the space between the retainer ribs 36. The first fixture studs 64 are threaded into the remaining fastener openings 28 in the valve closure and first fixture nuts 67 attached to urge the closure portion into closed position and the first fixture spacers 55a, 56a and 57a into firm engagement with the tank valve flange. Then the second fixture studs 100 are removed from the openings 28 in the valve closure, and the second fixture 70 is disassembled and removed. The first operator 24 and second operator 32 and retainer 34 are then raised with the first operator passing along the first fixture studs 64, and fasteners 26 are attached through the remaining openings in the first operator and through the openings 28 in the valve closure to hold the first operator 24 in place depending from the valve closure. In the assembled position the retainer ribs 36 engage the tank valve flange 14 and urge the valve closure 22 into the closed seated position. The first fixture studs 64 are then removed from the openings 28 in the valve closure and the first fixture 52 is removed. The remaining fasteners 26 are inserted to maintain the first and second operators and retainer in operative position.

A protective housing 38 may then be attached with fasteners 40 extending into the tank valve flange 14, and the bottom operable tank car valve assembly is completed, allowing the tank to be unloaded or moved to a different location for unloading.

Figure 8:
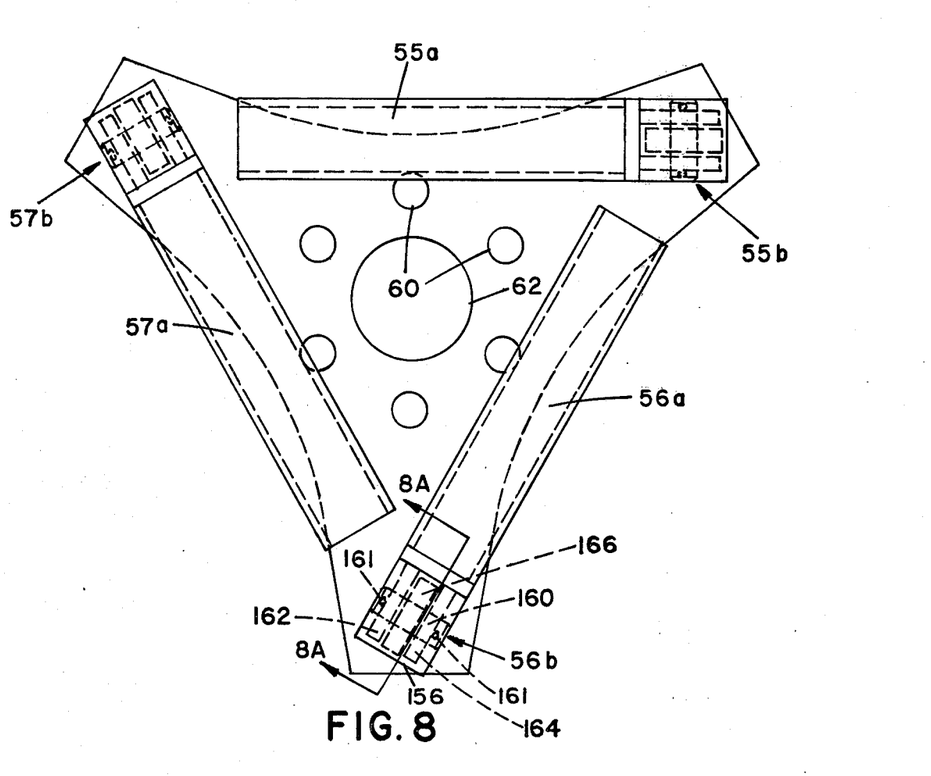
FIG. 8 is a plan view of an alternative first fixture in which the first fixture studs are pivotably mounted about hinges to be located on first plate to facilitate transporting the first fixture when it is not in use.
Figure 8A:
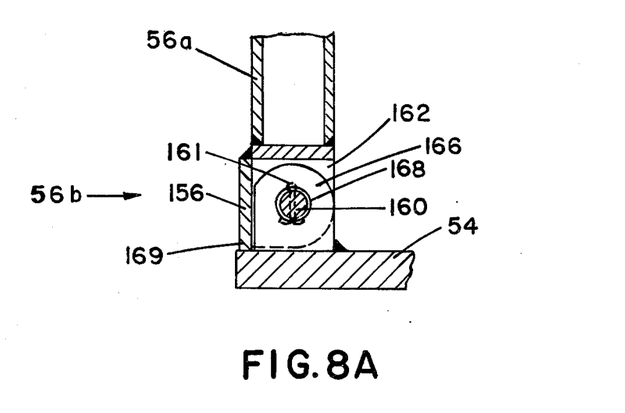
FIG. 8A is a sectional view looking in the direction of the arrows along the line 8A—8A in FIG. 8 illustrating the spacer in upright position.

FIGS. 8 and 8A illustrate an alternative first fixture arrangement in which the first fixture spacers 55a, 56a and 57a are pivotably mounted about respective hinge members 55b, 56b and 57b. Hinge members 56b includes a U shaped bracket 156 welded to spacers 56b. Extensions 162 and 164 of spacers 56a are pivotably mounted about pin 160 having cotter pins 161. Pin 160 extends through an opening 168 in a member 166 mounted on plate 54. The end 169 of bracket 156 abuts plate 54 in upright position as shown in FIG. 8A. In the folded position spacers 56a abut first plate 54.

The hinges 55b and 57b are constructed in the same manner as singe 56b. These hinges enable the spacers 55a, 56a and 57a to be pivoted to a down, inoperative position for easy transportation.

What is claimed is:

1. A fixture assembly for removing for repair and/or replacement some or all of an operating assembly of a bottom operable tank car valve while a valve closure portion of a valve assembly remains in closed position in engagement with a valve seat, preventing any lading from escaping from the tank while the damaged portion of the valve operating assembly including depending operator means is repaired and/or replaced, comprising:

a first fixture having a first fixture plate and at least a pair of first fixture spacers which extend from said first fixture plate to a tank car bottom flange, said spacers maintaining the first fixture plate spaced from the tank bottom flange; said first fixture plate including first fixture openings which align with valve closure openings in a valve closure; closure fasteners holding the depending operator means attached to the valve closure; at least some of said closure fasteners which align with said first fixture openings being removable and adapted to be replaced with first fixture studs extending through said first fixture openings openings in said depending operator means and into said valve closure openings from which said closure fasteners have been removed; first fixture stud fastening means attached to said first fixture studs secured against the lower surface of the first fixture plate to positively urge the valve closure into closed position into engagement with its seat; the remaining closure fasteners being removable from said valve closure openings to allow said depending operator means to descend to the upper surface of said first fixture plate; a second fixture including a second fixture plate inserted between said first fixture spacers and said first fixture studs and the tank bottom flange; said second fixture plate being generally V-shaped, including at least a pair of arms, with a portion of each arm engaging the tank bottom flange; second fixture studs inserted through second fixture openings provided in said second fixture arms, and being inserted into the remaining of said valve closure openings; second fixture fastening means attached to the lower ends of the second fixture studs to urge said second fixture into firm engagement with the tank bottom flange, and said valve closure into engagement with its seat; whereby said first stud fastening means may then be disconnected and the first fixture studs removed from said valve closure openings; and whereby said first fixture and said depending operator means may be removed from the tank bottom for repair or replacement of damaged valve operator parts, while said second fixture maintains the valve closure in closed position engagement with its seat, retaining the lading in the tank during repair or replacement of the valve operator parts which have been removed.

2. A fixture assembly according to claim 1 wherein said second fixture arms include spacers which engage the tank bottom flange.

3. A fixture assembly according to claim 1 wherein said first fixture spacers are pipe sections.

4. A fixture assembly according to claim 1 wherein said first fixture spacers are pivotably mounted on said first fixture plate to facilitate storage and/or transport.

5. A fixture assembly according to claim 1 wherein said first fixture plate includes a body portion and a plurality of radially spaced first fixture arms extending outwardly from said body portion, and wherein said first fixture spacers are attached to said first fixture arms.

6. A fixture assembly according to claim 5 wherein said body portion includes an enlarged opening to allow introduction of a tool to engage the second operator.

7. A fixture assembly according to claim 2 wherein a third plate is attached to the juncture of the V-shaped arms in said second fixture with removable fastening means; and wherein the upper surface of said third plate also engages the bottom surface of the tank bottom to assist in urging said valve closure into engagement with its seat.

8. A fixture assembly according to claim 7 wherein said second fixture plate includes a pocket and wherein said third plate is placed within said pocket and wherein at least one removable fastener maintains said second fixture plate and said third plate in engagement in said pocket.

9. A method for removing for repair and/or replacement some or all of an operating assembly of a bottom operable tank car valve while a valve closure portion of a valve assembly remains in closed position in engagement with a valve seat, preventing any lading from escaping from the tank while the damaged portion of the valve operating assembly including depending operator means is repaired and/or replaced, comprising:
providing a first fixture having a first fixture plate and at least a pair of first fixture spacers which extend from said first fixture plate to a tank car bottom flange, said spacers maintaining the first fixture plate spaced from the tank bottom flange; aligning first fixture openings in said first fixture with valve closure openings in a valve closure which attach with closure fasteners the depending operator means to the valve closure; removing at least some of said closure fasteners which align with said first fixture openings; replacing said removed closure fasteners with first fixture studs extending through said first fixture openings, openings in said depending operator means and into said valve closure openings; attaching first fixture stud fastening means to said first fixture studs against the lower surface of the first fixture plate to positively urge said valve closure into closed position in engagement with its seat; removing the remaining closure fasteners from said valve closure openings; lowering the depending operator means to the upper surface of said first fixture plate; providing a second fixture including a second fixture plate which is generally V-shaped, including a pair of outwardly extending arms; inserting said second fixture plate between said first fixture spacers and said first operator studs and into engagement with the tank bottom flange, whereby each arm engages the tank bottom flange; inserting second fixture studs through second fixture openings provided in said second fixture arms, and into the remainder of said valve closure openings; attaching second fixture fastening means to the lower ends of the second fixture studs to urge said second fixture into firm engagement with the tank bottom flange, and said valve closure into engagement with its seat; disconnecting said first stud fastening means from the lower end of said first fixture studs; removing said first fixture studs from said valve closure openings; removing said first fixture and said depending operator means from the tank bottom; repairing and/or replacing damaged valve operator parts of said depending operator means while said second fixture maintain the valve closure in engagement with its seat, retaining the lading in the tank during repair or replacement of the valve operator parts.

10. A method according to claim 9 including attaching a third plate to the juncture of the V-shaped arms in said second fixture plate with removable fastening means, whereby the upper surface of said third plate also engages the bottom surface of the tank bottom to assist in urging said valve closure into engagement with its seat flange.

11. A method according to claim 9 including reassembling the valve with repaired and/or replaced parts, comprising: placing the repaired and/or replaced parts of said depending operator means on said first fixture plate; inserting said first fixture studs through said first fixture openings and through said openings in said depending operator means, inserting said first fixture studs into the remaining of said valve closure openings; attaching first fixture fastening means to urge said valve closure into closed and seated position, and said first fixture spacers into into firm engagement with the tank bottom flange; removing said second fixture studs from the remainder of said valve closure openings; disassembling and removing said second fixture from the tank bottom; raising said depending operator means along said first fixture studs, attaching closure fasteners through at least some of the remainder of said valve closure to hold said depending operator means; removing said first fixture studs from the remainder of said valve closure openings; removing said first fixture from the tank bottom and inserting the remaining valve closure fasteners through the closure operator assembly into the valve closure to maintain the closure operator assembly in operative position.

12. A method according to claim 11 including unloading the lading with the reassembled depending operator means.

13. A method according to claim 11 including attaching a protective housing with fasteners extending into the tank bottom flange, and moving the tank to a different location for unloading.

* * * * *

UNITED STATES PATENT AND TRADEMARK OFFICE
CERTIFICATE OF CORRECTION

PATENT NO. : 4,161,958
DATED : July 24, 1979
INVENTOR(S) : Gunter R. Behle

It is certified that error appears in the above-identified patent and that said Letters Patent are hereby corrected as shown below:

Col. 2, line 31, change "ports" to --parts--.
Col. 4, line 66, after "100", delete the comma.
Col. 6, line 27, "members" should read --member--.
      line 28, "spacers" should read --spacer--; "56b" should read --56a--.
      line 36, "singe" should read --hinge--.
Col. 6, claim 1, line 61, insert a comma between "openings" (first occurrence) and "openings" (second occurrence).
      line 62, insert a comma after "means".
Col. 8, claim 9, line 12, insert a comma after "means".
      line 42, "maintain" should read --maintains--.

Signed and Sealed this

Thirteenth Day of November 1979

[SEAL]

Attest:

RUTH C. MASON
Attesting Officer

LUTRELLE F. PARKER
Acting Commissioner of Patents and Trademarks